US008181187B2

(12) United States Patent
Fraser et al.

(10) Patent No.: US 8,181,187 B2
(45) Date of Patent: May 15, 2012

(54) GATEWAYS HAVING LOCALIZED IN-MEMORY DATABASES AND BUSINESS LOGIC EXECUTION

(75) Inventors: Scott Edward Fraser, Collegeville, PA (US); Suresh Venkata Muppalla, New Hope, PA (US)

(73) Assignee: Portico Systems, Conshohocken, PA (US)

( * ) Notice: Subject to any disclaimer, the term of this patent is extended or adjusted under 35 U.S.C. 154(b) by 1473 days.

(21) Appl. No.: 11/566,073

(22) Filed: Dec. 1, 2006

(65) Prior Publication Data

US 2008/0133537 A1    Jun. 5, 2008

(51) Int. Cl.
*G06F 9/06* (2006.01)
(52) U.S. Cl. ......... 719/313; 719/311; 707/824; 707/825
(58) Field of Classification Search .................. 707/824, 707/825
See application file for complete search history.

(56) References Cited

U.S. PATENT DOCUMENTS

| | | | |
|---|---|---|---|
| 6,178,519 B1 | 1/2001 | Tucker | 714/4 |
| 6,223,164 B1 | 4/2001 | Seare et al. | 705/2 |
| 6,256,637 B1 | 7/2001 | Venkatesh et al. | 707/103 |
| 6,350,219 B1 | 2/2002 | Hobson | 482/97 |
| 6,457,021 B1 | 9/2002 | Berkowitz et al. | 707/201 |
| 6,687,702 B2 | 2/2004 | Vaitheeswaran et al. | 707/10 |
| 6,957,212 B2 * | 10/2005 | Peng | 707/758 |
| 7,409,379 B1 * | 8/2008 | Katzer | 1/1 |
| 2003/0041055 A1 * | 2/2003 | Nakamura et al. | 707/3 |
| 2003/0084057 A1 | 5/2003 | Balough | 707/100 |
| 2003/0135495 A1 | 7/2003 | Vagnozzi | 707/3 |
| 2004/0060006 A1 | 3/2004 | Lindblad et al. | 715/513 |
| 2004/0103105 A1 | 5/2004 | Lindblad et al. | 707/100 |
| 2005/0027701 A1 | 2/2005 | Zane et al. | 707/3 |
| 2005/0033720 A1 | 2/2005 | Verma et al. | 707/1 |
| 2005/0165838 A1 | 7/2005 | Fontoura et al. | 707/104.1 |
| 2005/0188055 A1 | 8/2005 | Saletore | 709/218 |
| 2005/0198062 A1 | 9/2005 | Shapiro | 707/102 |
| 2005/0203901 A1 | 9/2005 | Waldvogel et al. | 707/5 |
| 2005/0228791 A1 | 10/2005 | Thusoo et al. | 707/6 |
| 2005/0289125 A1 | 12/2005 | Liu et al. | 707/3 |
| 2005/0289175 A1 | 12/2005 | Krishnaporasad et al. | 707/102 |
| 2005/0289186 A1 | 12/2005 | Guo et al. | 707/200 |
| 2005/0289450 A1 | 12/2005 | Bent et al. | 715/506 |

(Continued)

OTHER PUBLICATIONS

Qiong Luo, Middle-Tier Database Caching for e-Business, 2002, pp. 1-12.*
"*Wells Fargo Turbocharges Internal SOA System*", Computerworld, May 9, 2006, 2 pps.
Tangasol website, *Coherence*, May 12, 2006, 2 pps.

(Continued)

*Primary Examiner* — H. S. Sough
*Assistant Examiner* — Syed Roni
(74) *Attorney, Agent, or Firm* — Edward L McMahon; Ohlandt, Greeley, Ruggiero & Perle, LLP

(57) ABSTRACT

A gateway is provided that includes an integration gateway portion, a domain gateway portion, and a hyper-memory portion is provided. The integration gateway portion has an integration rules engine, a search engine, and a first virtual machine. The domain gateway portion has a domain rules engine. The hyper-memory portion has a hyper-memory engine, a hyper-memory, and a second virtual machine. The integration portion accesses a database via the integration rules engine and the first virtual machine or via the search engine and the first virtual machine. The domain gateway portion accesses datasets of the database that are resident in the hyper-memory via the domain objects rules engine and the hyper-memory engine or via the search engine, the second virtual machine, and the hyper-memory engine.

17 Claims, 6 Drawing Sheets

U.S. PATENT DOCUMENTS

2006/0026154 A1* 2/2006 Altinel et al. ............ 707/5
2006/0085426 A1  4/2006 Verma et al. ............ 707/10
2007/0132770 A1* 6/2007 Stefanidis et al. ............ 345/541

OTHER PUBLICATIONS

"Case Study: Starwood Hotels Uses SOA to Improve Guest Services and Cut Costs", Apr. 27, 2006, 2 pps.

* cited by examiner

GATEWAYS HAVING LOCALIZED IN-MEMORY DATABASES AND BUSINESS LOGIC EXECUTION

CROSS REFERENCE TO RELATED APPLICATIONS

This application is related to U.S. application Ser. No. 11/430,753 filed on May 9, 2006, the entire contents of which are incorporated by reference herein.

BACKGROUND OF THE INVENTION

1. Field of the Invention

The present disclosure is related to gateways. More particularly, the present disclosure is related to gateways having localized in-memory databases and business logic execution capabilities.

2. Description of Related Art

Enterprises are increasingly being asked to expose business logic and information through service layers. The performance of the exposed business logic and data access can be a limiting factor on their usefulness and commercial success.

One approach for exposing business logic and information via a service layer is to install an application known as a gateway. This application sits between the consumers of its services and data, and the actual sources of the data and business logic, which are typically based on older relational database technology and programming languages. Unfortunately, prior gateways have not provided sufficient resolution or query time, when using the large amounts of data and business logic common in today's enterprise applications, because of their reliance on older relational database technology and methods of invoking and executing said business logic.

Many prior solutions attempt to lower the resolution time by better organizing, relating, and indexing the data passing through the gateway, and providing Remote Procedure Call style access to business logic. Unfortunately, such database indexing schemes offered by relational databases are disk based, and the data and business logic is typically located on a separate physical server. As such, all of these solutions are limited by the input-output rate of the disk, as well as network latency.

Recently, some solutions that may be used as an alternate "backend" for a gateway instead of a relational database, have attempted to accelerate the data resolution time by storing some of the data directly in the RAM or cache memory of the gateway. These solutions, such as those available from Prevayler and Tangesol, have shown some success at overcoming the limitations imposed on the resolution time by the disk input-output rate. Unfortunately, scalability of such systems has proven difficult and expensive because of their reliance on distributed caches that introduce an element of network latency into data and business logic access, their usage of Java objects in their implementation which causes undesirable "object churning" of the items in the database and negatively impacts the performance and speed of these systems, and the fact that these components are not tightly coupled with a complete gateway solution.

As used herein, the term "object churning" refers to the act within a JAVA construct of continually creating and discarding objects (including arrays) from the memory heap. This object creation and destruction is managed by a software component known as a "garbage collector", and the overhead involved becomes a bottleneck when such a system is under high load.

Accordingly, there is a continuing need for gateways and methods that overcome, alleviate and/or mitigate one or more of the aforementioned and other deleterious effects of the prior art.

BRIEF SUMMARY OF THE INVENTION

A gateway is provided that includes an integration gateway portion, a domain gateway portion, and a hyper-memory portion is provided. The integration gateway portion has an integration rules engine, a search engine, and a first virtual machine. The domain gateway portion has a domain rules engine. The hyper-memory portion has a hyper-memory engine, a hyper-memory, and a second virtual machine. The integration portion accesses a database via the integration rules engine and the first virtual machine or via the search engine and the first virtual machine. The domain gateway portion accesses datasets of the database that are resident in the hyper-memory via the domain objects rules engine and the hyper-memory engine or via the search engine, the second virtual machine, and the hyper-memory engine.

A gateway is also provided that includes a search engine, a first virtual machine, a second virtual machine, a hyper-memory engine, and a hyper-memory having datasets of a database resident thereon. The search engine and the first virtual machine access the database upon receipt of an integration gateway search request. The search engine, the second virtual machine, and the hyper-memory engine access the datasets from the hyper-memory upon receipt of a domain gateway search request.

A hyper-memory portion for a gateway is also provided. The hyper-memory portion includes a hyper-memory and a hyper-memory engine in the hyper-memory for storing and indexing data entirely within the hyper-memory.

The above-described and other features and advantages of the present disclosure will be appreciated and understood by those skilled in the art from the following detailed description, drawings, and appended claims.

DETAILED DESCRIPTION OF THE INVENTION

Figure 1:
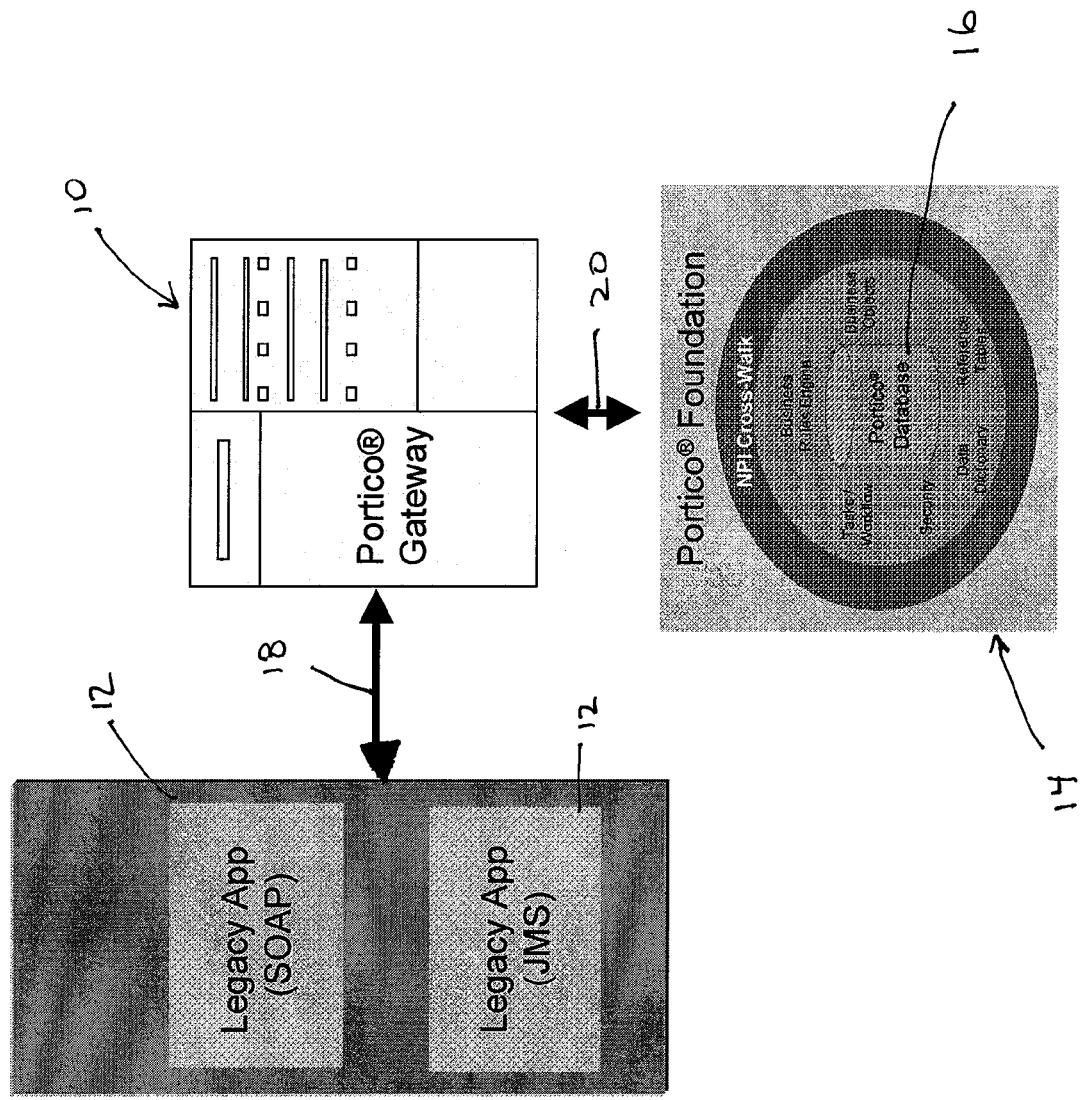
FIG. 1 is a schematic depiction of an exemplary embodiment of a gateway according to the present disclosure in use between a legacy software system and an enterprise application.

Referring to the drawings and in particular to FIG. 1, an exemplary embodiment of a gateway according to the present disclosure is generally referred to by reference numeral 10.

Gateway 10 provides a clusterable solution that provides programmatic access to very large datasets resident on the gateway.

Advantageously, gateway 10 includes an in-memory database that allows for the storing, indexing, updating, and searching of large amounts of structured data from database 16 entirely in the memory of the gateway. In this manner, and by levering the 64-bit technology currently available, gateway 10 is configured to provide a resolution or query time for vast quantities of data at the microsecond level.

Gateway 10 is shown, by way of example, in use between one or more legacy software systems 12 (two shown) and an enterprise application 14 having a database 16. In this embodiment, gateway 10 enables real time exchange of data between software systems 12 and database 16 of enterprise application 14.

Gateway 10 is in communication with software system 12 via a first communication channel 18. Similarly, gateway 10 is in communication with enterprise application 14 via a second communication channel 20. First and second communication channels can be any know communication device and/or protocol such as, but not limited to, the Internet, a Local Area Network (LAN), a Wide Area Network (WAN), a wireless network, and others.

Data within database 16 can include data in Extensible Markup Language (XML) metadata, and other formats. In this embodiment, gateway 10, software system 12, first communication channel 18, enterprise application 14, and second communication channel 20 are configured to communicate the data resident in database 16. However, it is contemplated by the present disclosure for the data in database 16 to be any type of object oriented data, data fields, Hyper Text Markup Language (HTML), any script, such as JavaScript, Jython, SQL, and any other data format.

Software systems 12 can be those commonly used by a health care organization, while enterprise application 14 can be the Portico Foundation Software, which is shown and described in co-pending U.S. application Ser. No. 11/430,753 filed on May 9, 2006, the entire contents of which are incorporated by reference herein. However, it is contemplated by the present disclosure for gateway 10 to find uses between any software applications where the transmission of object oriented data is required.

Figure 2:
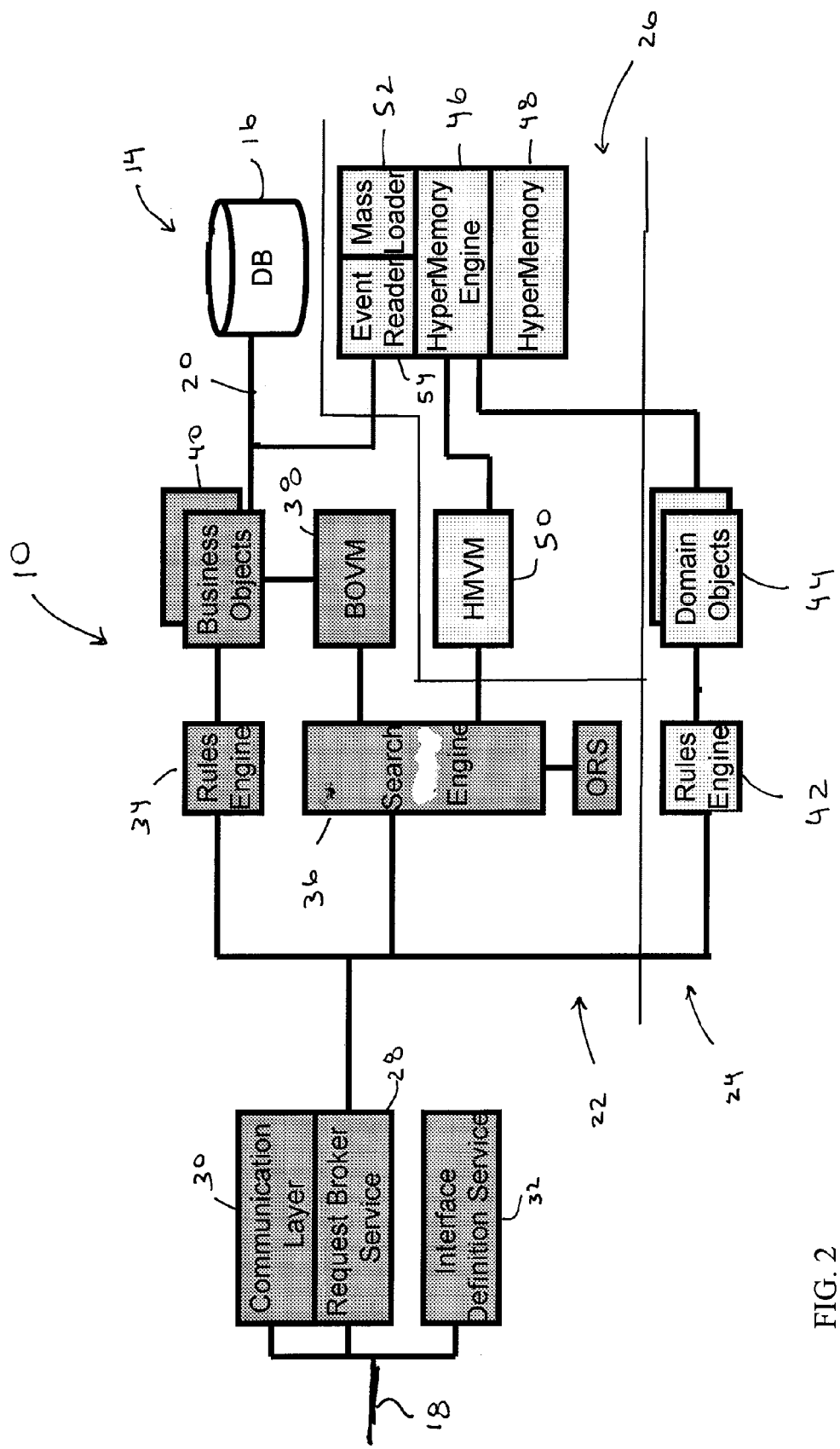
FIG. 2 is an exemplary embodiment of the gateway of FIG. 1.

Gateway 10 is described in more detail with reference to the architecture of the gateway as illustrated in FIG. 2. Gateway 10 is configured to support asynchronous and synchronous communications, as well as request and reply communication models. Moreover, gateway 10 is both horizontally and vertically extensible and scaleable by adding additional nodes of the gateway on a particular server and/or by adding additional servers running additional nodes of the gateway. As used herein, the term node means one instance of gateway 10 running in one instance of a Java Virtual Machine (JVM).

Advantageously, gateway 10 has an architecture that allows gateway 10 to be assembled as a cluster of nodes, where each node does not communicate with or even know of the existence of the remaining nodes in the cluster. Thus, each instance of gateway 10 shares nothing with other instances of the gateway when assembled in a cluster. As used herein, a cluster means a plurality of nodes running on separate servers and/or separate processors on the same server. When arranging gateway 10 in a cluster, the gateways are typically placed behind a hardware load balancer (not shown) to balance the load of interactions among the various nodes in the cluster. Therefore, gateway 10 can be extended horizontally. Gateway 10 can also be scaled vertically due to a multi-threaded architecture that provides a nearly linear increase in performance as additional processors are added to an individual node in the cluster.

For purposes of clarity, gateway 10 is described herein by way of example only in use with JAVA programming construct. However, it is contemplated by the present disclosure for gateway 10 to find use with other programming constructs such as, but not limited to, MICROSOFT.NET, Java Server Pages, Java Server Faces, C++, C, Perl, Jython, Python, Ruby, Groovy, PHP, and others, and others.

Gateway 10 includes an integration gateway portion 22, a domain gateway portion 24, and a hyper-memory portion 26. Advantageously, hyper-memory portion 26 is an in-memory database that allows for the storing, indexing, updating, and searching of large amounts of structured data from database 16 via integration and domain gateway portions 22, 24. Hyper-memory portion 26 does not replace the persistent, transactional, relational data store such as is implemented by modern Relational Database Management Systems. Rather, hyper-memory portion 26 loads, indexes, and searches large quantities of data in a scalable and high-performing fashion.

It should be recognized that gateway 10 is described herein by way of example including both integration and domain gateway portions 22, 24. Of course, it is contemplated by the present disclosure for gateway 10 to have only integration gateway portion 22, only domain gateway portion 24, or any combinations thereof. Moreover, it is contemplated by the present disclosure for gateway 10 to include only hyper-memory portion 26.

Integration and domain gateway portions 22, 24 communicate between software system 12 and enterprise application 14 via first and second communication channels 18, 20 in a known manner. For example, gateway 10 can include a Request Broker Service (RBS) service 28, a communication layer 30, and an Interface Definition Service 32.

Integration gateway portion 22 includes an integration rules engine 34, a search engine 36, and a first virtual machine 38. First virtual machine 38 is an implementation of a computational engine, also known as a processor, that is capable of executing an instruction set. This instruction set is a list of all instructions and their variations that the processor is capable of executing. The instruction set of first virtual machine 38 includes operations specific, but not limited to, using the business objects 40 to search and retrieve data stored in database 16. The instruction set of virtual machine 38 is known as a "byte code". Search engine 36 parses XML search queries and generates corresponding sets of instructions in this instruction set "language" that are then given to virtual machine 38 to execute, in a manner similar to how the Java byte code language is processed by the Java Virtual Machine (JVM).

Rules engine 34 enables external system 12 to execute a business object or rule 40 resident on enterprise software 14 and retrieve the results. Search engine 36 enables external system 12 to query database 16 resident on enterprise software 14 so that the external system is insulated from the database structure of the enterprise software and has to only specify what information is required and the output format.

In the illustrated embodiment, integration gateway portion 22 is described by way of example as including both integration rules engine 34 and search engine 36. However, it is contemplated by the present disclosure for integration gateway portion 22 to have only rules engine 34, only search engine 36, or any combinations thereof.

Domain gateway portion 24 includes a domain rules engine 42. Domain rules engine 42 enables external system 12 to execute a domain object or rule 44 resident in enterprise software 14 and retrieve the results from hypermemory 48.

Hyper-memory portion 26 includes a hyper-memory engine 46, a hyper-memory 48, and a second virtual machine 50. Hyper-memory engine 46 is an in-memory data engine that stores and indexes entirely in memory 48. Thus, hyper-memory portion 26 provides a high speed caching layer within gateway 10 in which datasets of information are accessed.

Hyper-memory 48 includes data structures stored in random access memory (RAM) which usually includes, but is not limited to, integrated circuits (IC) attached directly or via sockets to the motherboard of a computer. Types of RAM that Hyper-memory 48 may be stored in include, but are not limited to, SDRAM, DDR, RDRAM, DDR 2, DDR 3, and others.

Hyper-memory 48 is intended for high-speed (microsecond level) access to records. Therefore, hyper-memory engine 46 avoids unnecessary JAVA object creation and leverages performance best practices, algorithms, and data structures that enable such high speeds.

Second virtual machine 50 is an implementation of a computational engine, also known as a processor, that is capable of executing an instruction set. This instruction set is a list of all instructions and their variations that the processor is capable of executing. The instruction set of virtual machine 50 includes operations specific, but not limited to, using the hyper memory portion 46 to search and retrieve data stored in hyper-memory 48. The instruction set of virtual machine 50 is known as a "byte code". Search engine 36 parses XML search queries and generates corresponding sets of instructions in this instruction set "language" that are then given to virtual machine 50 to execute, in a manner similar to how the Java byte code language is processed by the Java Virtual Machine (JVM).

Hyper-memory portion 26 also includes a mass Loader interface 52 and an event reader 54. Mass loader interface 52 reads data from database 16 and, via hyper-memory engine 46, stores the data in hyper-memory 48. Event reader 54 is the top-level interface that parses events that are stored in, but not limited to, an XML format in database 16.

Hyper-memory engine 46 hosts and manages hyper-memory 48 by providing programmatic access to the data and structures loaded into hyper-memory 48 via application program interface (API) calls. The API calls from hyper-memory engine 46 include schema definition, data manipulation, data searching, data processing, and instrumentation.

The operation of integration and domain gateway portions 22, 24 of gateway 10 are described with reference to sequence diagrams shown in FIGS. 3 through 6.

Figure 3:
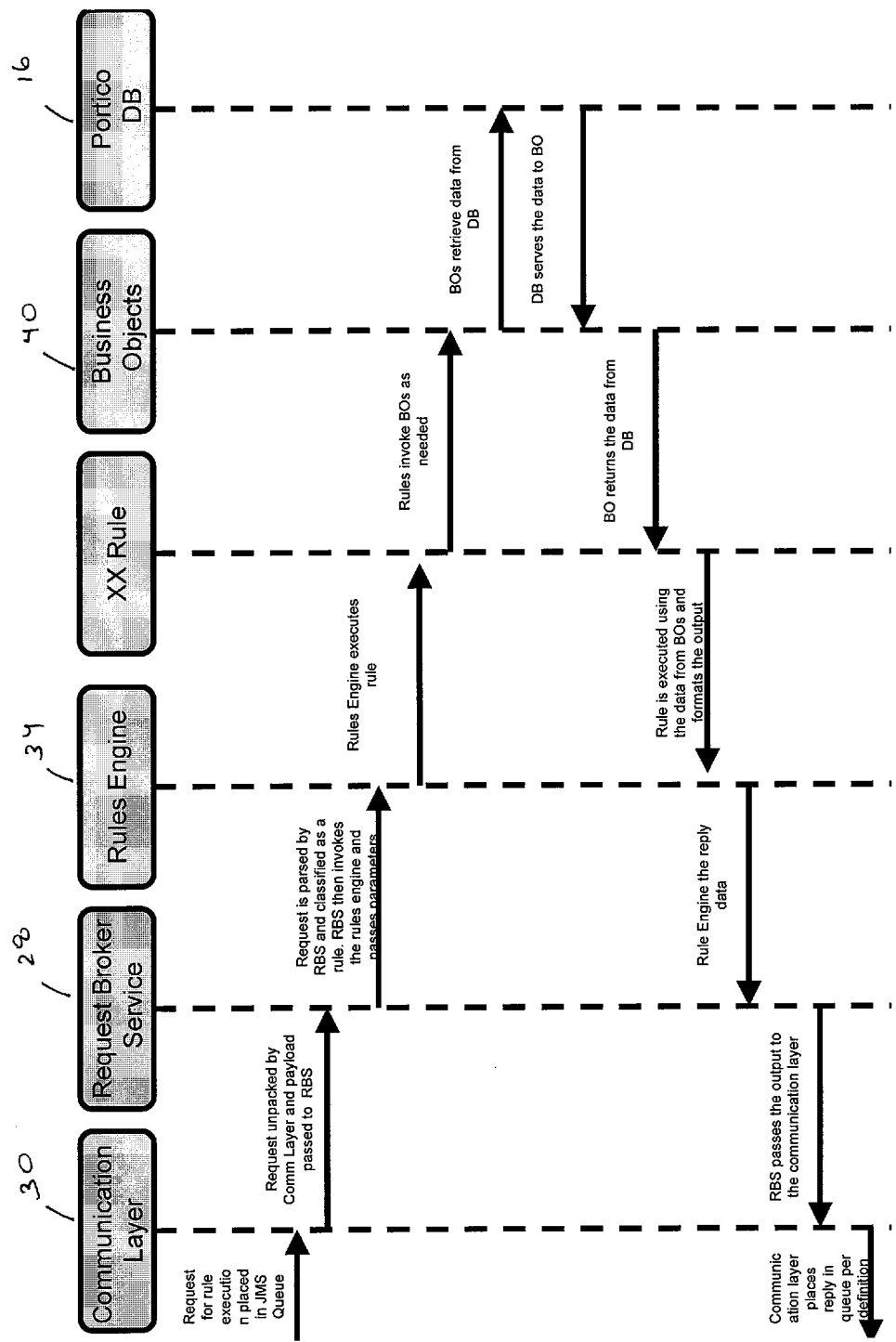
FIG. 3 is an exemplary embodiment of a rules service sequence diagram of an integration gateway portion of FIG. 2.

FIG. 3 is an exemplary embodiment of a rules service sequence diagram 60 of integration gateway portion 22. At the beginning of rules service sequence diagram 60, a request for rule execution is placed in the JAVA message service (JMS) queue. The JMS request is unpacked by communication layer 30 and the payload of the request is passed on to Request Broker Service 28. The JMS request is parsed by RBS 28 and classified as a rule. RBS 28 then invokes integration rules engine 34 so that the integration rules engine 34 executes the rule, which invoke business objects 40 as needed. In response, business objects 40 retrieve data from database 16 and the database serves the data to the business objects. The rule is executed by integration rules engine 34 using the data from business objects 40 so that the output is formatted according to the rule. Then, integration rules engine 34 sends the output to RBS 38, which passes the output to the communication layer 30. Finally, the communication layer 30 places the output in the JMS queue.

Figure 4:
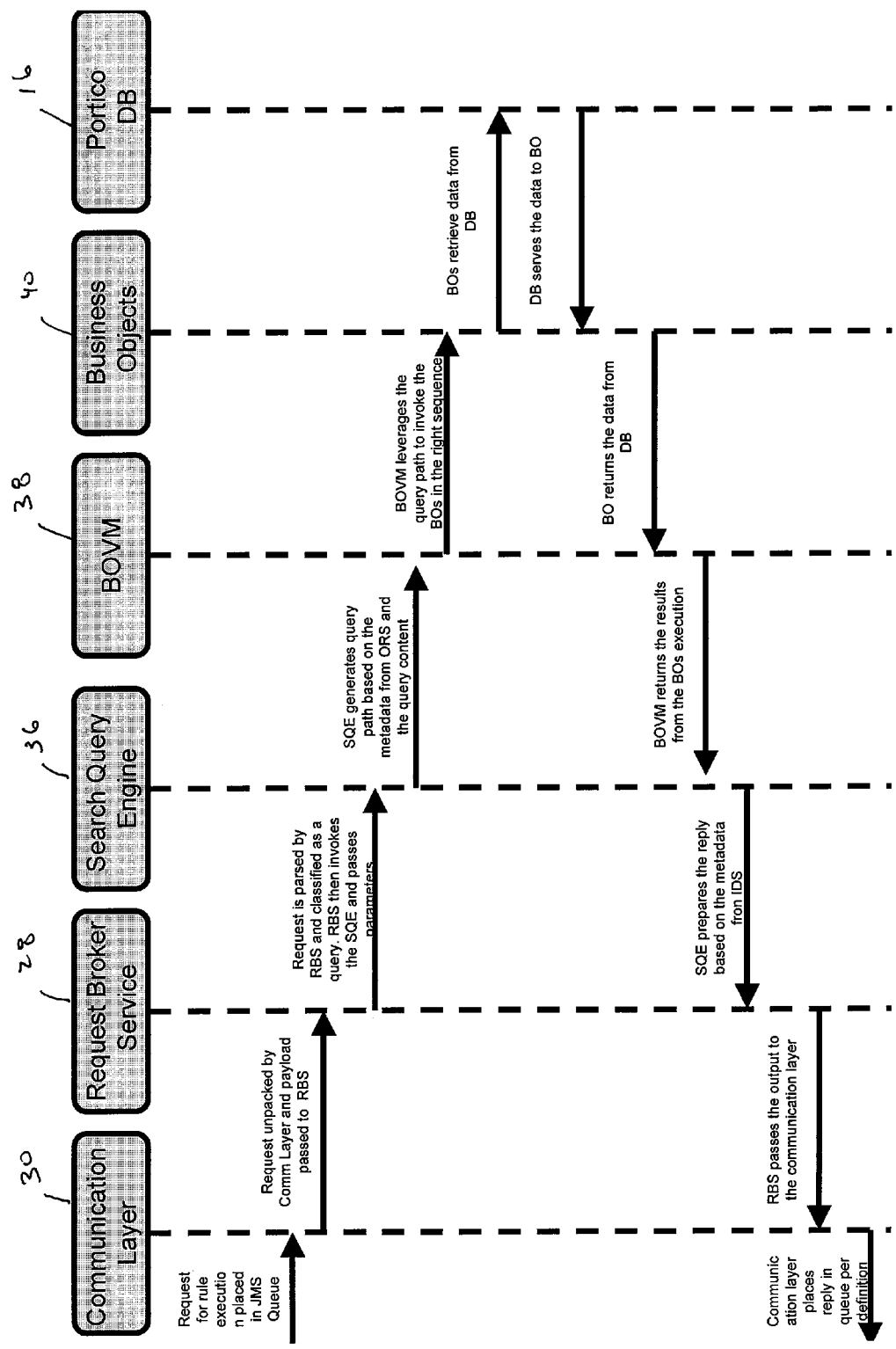
FIG. 4 is an exemplary embodiment of a query service sequence diagram of the integration gateway portion of FIG. 2.

FIG. 4 is an exemplary embodiment of a query service sequence diagram 62 of integration gateway portion 22. At the beginning of query service sequence diagram 62, a request for rule execution is placed in the JAVA message service (JMS) queue. The JMS request is unpacked by communication layer 30 and the payload of the request is passed on to Request Broker Service 28. The JMS request is parsed by RBS 28 and classified as a query. RBS 28 then invokes search engine 36. Search engine 36 generates the query path based on the metadata from the Object Relational Service (ORS) of the query engine. The first virtual machine 38 leverages the query path to invoke the business objects 40 in the right sequence. In turn, the business objects 40 retrieve data from database 16 and the database serves the data to the business objects. First virtual machine 38 returns the results from business objects 40 to the search engine 36. The search engine 36 prepares the reply based on the metadata from the IDS 32. The, RBS 38 passes the output to the communication layer 30 and the communication layer 30 places the reply in the JMS queue.

Figure 5:
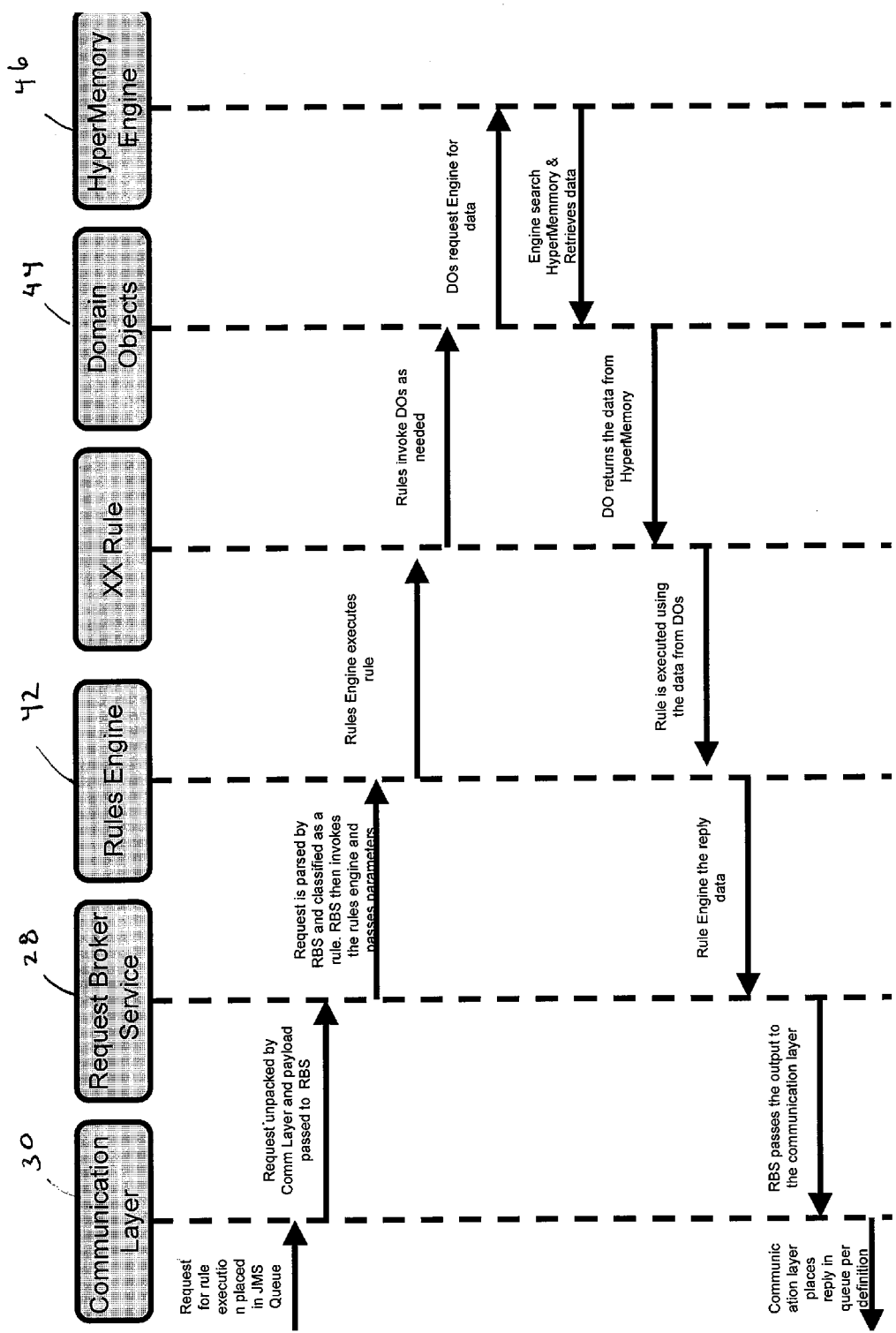
FIG. 5 is an exemplary embodiment of a rules service sequence diagram of the domain gateway portion of FIG. 2.

FIG. 5 is an exemplary embodiment of a rules service sequence diagram 64 of domain gateway portion 24. At the beginning of rules service sequence diagram 64, a request for rule execution is placed in the JAVA message service (JMS) queue. The JMS request is unpacked by communication layer 30 and the payload of the request is passed on to Request Broker Service 28. The JMS request is parsed by RBS 28 and classified as a rule. RBS 28 then invokes rules engine 42 so that the engine executes the rule, which invoke domain objects 44 as needed. In response, domain objects 44 request hyper-memory 46 to retrieve data from hyper-memory 48. Domain objects 44 return the data to rules engine 42 using the rule from domain objects 44 so that the output is formatted according to the rule. Then, engine 42 sends the output to RBS 28, which passes the output to the communication layer 30. Finally, the communication layer 30 places the output in the JMS queue.

Figure 6:
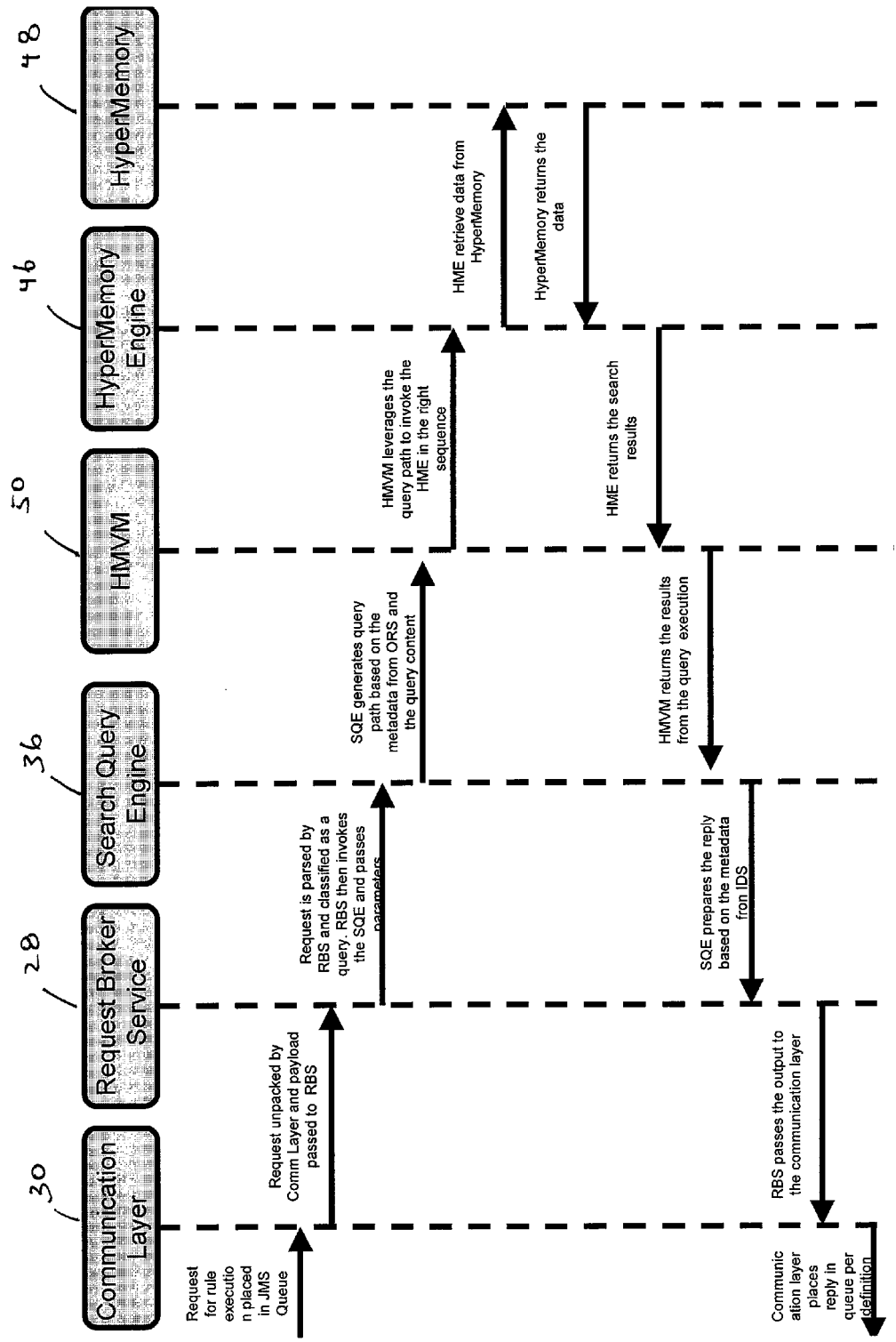
FIG. 6 is an exemplary embodiment of a query service sequence diagram of the domain gateway portion of FIG. 2.

FIG. 6 is an exemplary embodiment of a query service sequence diagram 66 of domain gateway portion 24. At the beginning of query service sequence diagram 66, a request for rule execution is placed in the JAVA message service (JMS) queue. The JMS request is unpacked by communication layer 30 and the payload of the request is passed on to Request Broker Service 28. The JMS request is parsed by RBS 28 and classified as a query. RBS 28 then invokes search engine 36. Search engine 36 generates the query path based on the metadata from the ORS. The second virtual machine 50 leverages the query path to invoke the hyper-memory machine 46 in the right sequence. In turn, hyper-memory machine 46 retrieves data from hyper-memory 48 and serves the data to second virtual machine 50. Second virtual machine 50 returns the results to the search engine 36. The search engine 36 prepares the reply based on the metadata from the IDS 32. The, RBS 38 passes the output to the communication layer 30 and the communication layer 30 places the reply in the JMS queue.

The schema definition includes but is not limited to: table creation, table dropping, index creation, reindexing, and index deletion. The data manipulation includes but is not limited to: record insertion, record deletion, record updating, reloading tables, cloning tables, and truncating tables. The data searching includes but is not limited to: Rowid Search by Key/Value pair, Rowid Search by Map of Key/Values, Inner Rowid Join by one Joining Column, Tablescan Search by Map of Key/Values, Tablescan Search by Map of Key/Values and word-distance algorithm, and Get All Rowids by Tablename. The data processing includes but is not limited to: Rowid UNION, Rowid INTERSECTION, Convert Rowids To List of String Maps, Convert Rowid to Char Arrays, and Convert Rowid to String Map. The instrumentation includes but is not limited to: Get Record Count by Tablename, Get Schema for JMX Interrogation, Get Statistics in a User-friendly String, Get Table Names, and Get Total Records Loaded.

Thus, hyper-memory portion 26 stores data in hyper-memory 48 in logical "tables" that have a "schema" including column names. The indexes of the tables use data structures such as, but not limited to, two level digital ternary search trees (trie) that branch to ternary trees. Each node in the index has a set that lists all matching rowids, which map to individual records stored in hyper-memory 48. Additional metadata is stored on the index nodes.

The tables in hyper-memory 48 are comprised of "records" which are made up of individual "fields", similar to a relational database. At a physical level the records are stored in "blocks", and blocks in "extents". Any given record in hyper-memory 48 has a unique "rowid" that identifies its absolute location in the extent/block/record data structures, and is never changing. A rowid contains the extent, block, and record number in a bit shifted format. In other words, by doing simple bit shifting operations on the rowid, the extent, block, and record number for the rowid is calculated by hyper-memory engine 46.

Additionally, the indexes generated by hyper-memory engine 46 support fuzzy searches, and have their statistics maintained dynamically. Therefore there is never a need to recompute statistics, as they are always up to date.

The indexes assigned by hyper-memory engine 46 to records in hyper-memory 48 can track the following in real time: how many total records indexed, how many distinct values are indexed, at any given node in the index, who are the children nodes (to support fuzzy searching), and at any given node in the index, how many children nodes below that node.

The indexes assigned by hyper-memory engine 46 to records in hyper-memory 48 employ a modular architecture to support not only standard "greater than, lesser than" indexing schemes, but "fuzzy" and "domain specific" indexing schemes. For example, an index that uses special address specific fuzzy matching logic can be created and managed by hyper-memory engine 46 so as to allow for instantaneous "fuzzy address searches".

Thus, hyper-memory portion 26 works by organizing hyper-memory 48 to optimally store Data and Indexes. Data is stored in memory 48 by the creation and management of Extents, Blocks, and Records by engine 46.

In hyper-memory portion 26, the Record represents an individual set of keys and values. The key values are unique within a given Record. At the physical level, only the values are stored in memory 48, in a static char array. Hyper-memory engine 46 keeps track at the "table schema" level what order the columns are stored in, and therefore what column each individual value is mapped to.

In hyper-memory portion 26, the Block represents a set of Records. Further, the Extent represents a set of Blocks. Each extent logically includes a "Block map", which is a static array of Blocks. Therefore each "extent" is one instance of a "Block map". Each Block within the Block map is a set of records, the number of records being up to the configured Block Size. So the total record capacity of a table in hyper memory 48 is equal to:

(Number of Extents )×(Block Map Size)×(Block Size)

So a table including one extent, with a block map size of 1 million, and a block size of 16, can contain up to 16 million records. Advantageously, the size of the Block and/or the size of the Extent within hyper-memory 48 are configurable via deployment descriptors and runtime property configuration files at the table level.

Indexes are stored entirely in memory 48 as sets of integer arrays that are initially scaled in size based on the size of data Extent and Block sizes. It is impossible to determine how much RAM an index is going to need just based on Extent and Block size until the actual records are known. This is because the distribution of data (its uniqueness or lack thereof) impact the amount of RAM the index data structure will finally require once generated. Advantageously, as records are added to the tables in hyper-memory 48, the indexes automatically grow to accommodate additional RAM as needed. The Indexes support a modular architecture in which the actual indexing scheme may be extended and enhanced beyond basic "greater than less than" logic.

For example, a prior art index might consider the following two unique and distinct strings of data:

123 Any Street USA

123 Any St. USA.

This type of indexing is supported by default in hyper-memory portion 26. By implementing domain specific indexes, hyper-memory portion 26 also indexes the above two values with an index that knows and understands that the two strings are addresses, and that in the domain of addresses they are logically equivalent. In other words, according to a domain specific "Address Index" according to the present disclosure:

123 Any Street USA=123 Any St. USA

Accordingly, gateway 10 having hyper-memory portion 26 allows for domain specific indexing and provides the ability to define, load, index, access and query vast quantities of data with absolutely no disk input-output. Additionally, gateway 10 having hyper-memory portion 26 provides query resolution times of less than about 1 millisecond.

Gateway 10 does not require the computational overhead related to transactional integrity (i.e., Oracle) and does not require computational or network input-output overhead related to managing a distributed cache (i.e., Tangesol's Coherence). Hyper-memory portion 26 uses JAVA static types to avoid "churning".

Hyper-memory portion 26 can be deployed in a clustered environment, in which multiple nodes in the cluster all load and provide access to the same, or different, sets of data. The configuration of what node loads what data into hyper-memory 48 is provided by the Object Relational Service (ORS) of search engine 36 and the Interface Definition Service 32.

Hyper-memory portion 26 provides query times at the microsecond level by using the digital trie and ternary tree based indexes, by minimizing JAVA object creation in code execution path, and optimizing the data structures within memory 48.

Hyper-memory portion 26 is easily scaled to provide the ability to handle many simultaneous queries and lookups. High performance within hyper-memory portion 26 is provided by the minimization of JAVA object creation in code execution path, the use of JAVA primitive types as opposed to JAVA objects, the Index data structures, and read-write locking synchronization in preference to mutual exclusion locking wherever possible. A read-write lock is a synchronization strategy in which multiple readers may simultaneously hold a lock when there are no threads attempting to write to hyper-memory 48. Multiple threads may read data and use indexes in hyper-memory 48 without "blocking", even when the same data structure elements and indexes are being used at the same time. Read-write locking provides a higher level of concurrency than is possible with older technologies based on more common locking strategies such as mutual exclusion locking. Therefore hyper-memory portion 26 supports higher throughput than previously possible.

Further, hyper-memory portion 26 also allows for Domain specific Indexing, which includes a modular Index architecture allowing for development of new indexing schemes as needed.

In some embodiments, gateway 10 can use a business rule 40 from rules engine 34 to load foreign database objects into hyper-memory 48, index the objects, and reload them periodically using the embedded scheduler and possibly solve some of the data store synchronization issues. Alternately, gateway 10 can be used to gain orders of magnitude in performance by loading parts of a foreign system's data store into Hyper-memory 48 and join it with data already in the hyper-memory instead of making fine-grained calls to the external system 12. Thus, gateway 10 not only ensures real time exchange of data, but is also configured to solve data integration problems experienced during data transformation between two or more non-coherent databases.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A gateway comprising:
   an integration gateway portion having an integration rules engine, a search engine, and a first virtual machine;
   a domain gateway portion having a domain rules engine; and
   a hyper-memory portion having a hyper-memory engine, a hyper-memory, and a second virtual machine,
   wherein said integration portion accesses a database via said integration rules engine and said first virtual machine or via said search engine and said first virtual machine,
   wherein said domain gateway portion accesses datasets of said database that are resident in said hyper-memory via said domain objects rules engine and said hyper-memory engine or via said search engine, said second virtual machine, and said hyper-memory engine, and
   wherein said hyper-memory portion provides a resolution or query time for said datasets of less than 1 millisecond.

2. The gateway according to claim 1, wherein said hyper-memory portion further comprises a mass loader interface and an event reader.

3. The gateway according to claim 1, wherein said hyper-memory portion provides programmatic access to said datasets resident in said hyper-memory.

4. The gateway according to claim 1, further comprising a first communication channel for communicating with a software system and a second communication channel for communicating with an enterprise application having the database resident thereon.

5. The gateway according to claim 4, wherein said first and second communication channels are selected from the group consisting of an Internet, a Local Area Network (LAN), a Wide Area Network (WAN), a wireless network, and any combinations thereof.

6. The gateway according to claim 1, further comprising an Object Request Broker service, a communication layer, and an Interface Definition Service, said Object Request Broker service, communication layer, and Interface Definition Service providing communication among said integration gateway portion, said domain gateway portion, and said hyper-memory portion.

7. The gateway according to claim 6, wherein said search engine further comprises an Object Relational Service.

8. The gateway according to claim 7, wherein said Object Relational Service said Interface Definition Service determine a configuration of said datasets loaded in said hyper-memory.

9. A gateway comprising:
   a search engine;
   a first virtual machine;
   a second virtual machine;
   a hyper-memory engine; and
   a hyper-memory having datasets of a database resident thereon, said search engine and said first virtual machine accessing said database upon receipt of an integration gateway search request, and said search engine, said second virtual machine, and said hyper-memory engine accessing said datasets from said hyper-memory upon receipt of a domain gateway search request, wherein said hyper-memory engine provides a resolution or query time for said datasets of less than 1 millisecond.

10. The gateway according to claim 9, further comprising a domain rules engine, said domain rules engine and said hyper-memory engine accessing said datasets from said hyper-memory upon receipt of a domain gateway rules request.

11. The gateway according to claim 9, further comprising an integration rules engine, said integration rules engine accessing said database upon receipt of an integration gateway rules request.

12. The gateway according to claim 9, wherein said hyper-memory engine further comprises a mass loader interface and an event reader.

13. The gateway according to claim 9, further comprising a first communication channel for communicating with a software system and a second communication channel for communicating with an enterprise application having the database resident thereon.

14. A hyper-memory portion included in a gateway, the hyper-memory portion comprising:
   a hyper-memory; and
   a hyper-memory engine in said hyper-memory for storing and indexing data entirely within said hyper-memory, wherein said hyper-memory engine provides a resolution or query time for said data within said hyper-memory of less than 1 millisecond.

15. The hyper-memory portion according to claim 14, further comprising a hyper-memory virtual machine.

16. The hyper-memory portion according to claim 14, wherein said hyper-memory engine provides programmatic access to said data.

17. The hyper-memory portion according to claim 14, further comprising a mass loader interface and an event reader.

* * * * *